United States Patent [19]

Hatter et al.

[11] 4,129,948
[45] Dec. 19, 1978

[54] CIRCLE DRAWING AND MEASURING DEVICE

[76] Inventors: Edward E. Hatter, 25892 Serenata Dr., Mission Viejo, Calif. 92675; Richard H. Taylor, 13691 Gershon Pl., Santa Ana, Calif. 92705

[21] Appl. No.: 886,877

[22] Filed: Mar. 15, 1978

Related U.S. Application Data

[63] Continuation-in-part of Ser. No. 771,014, Feb. 22, 1977, abandoned.

[51] Int. Cl.² .............................................. B43L 9/04
[52] U.S. Cl. ..................................................... 33/27 C
[58] Field of Search ........... 33/1 B, 1 N, 27 C, 174 B, 33/75

[56] References Cited

U.S. PATENT DOCUMENTS

| 555,287 | 2/1896 | Horrigan | 33/174 B |
|---|---|---|---|
| 893,085 | 7/1908 | Loughborough | 33/104 X |
| 1,154,673 | 9/1915 | Van Ness | 33/27 C |
| 1,266,010 | 5/1918 | Golden | 33/26 |
| 2,542,537 | 2/1951 | Klemm | 33/27 C |
| 2,958,132 | 11/1960 | Hartbauer et al. | 33/27 C |
| 3,465,445 | 9/1969 | Fisher | 33/27 C |
| 3,795,053 | 3/1974 | Burke | 33/27 C |

FOREIGN PATENT DOCUMENTS

| 1285541 | 1/1962 | France | 33/27 C |
|---|---|---|---|
| 564645 | 10/1944 | United Kingdom | 33/27 C |

OTHER PUBLICATIONS

"Floating Triangles," by J. R. Cassell Co. Inc., 9/1946.

Primary Examiner—Harry N. Haroian
Attorney, Agent, or Firm—Richard L. Gausewitz

[57] ABSTRACT

A unique "compass" device for drawing and measuring circles, and employing a template with a center pin and many holes. Indicia are provided on the template to indicate concentric and generally annular zones centered at a certain center, each such zone having its boundary relatively adjacent the center located a first distance from the center (on the particular distance scale employed on the compass), and also having its boundary relatively remote from the center located a second and higher distance from the center on such distance scale. The holes lie along an Archimedes spiral centered at the center, and all holes located a first perdetermined fraction of each whole number (of the particular distance scale) are disposed along one radial line extending from the center; all the holes located a second and next-higher predetermined fraction of each whole number of the particular distance scale are disposed along a second radial line, etc.

35 Claims, 4 Drawing Figures

CIRCLE DRAWING AND MEASURING DEVICE

CROSS REFERENCE TO RELATED APPLICATION

This application is a continuation-in-part of our co-pending patent application, Ser. No. 771,014, filed Feb. 22, 1977, for MEASURING COMPASS, now abandoned.

BACKGROUND OF THE INVENTION AND DESCRIPTION OF PRIOR ART

Heretofore various devices have been used for drawing circles. However, those devices commonly used typically require the user to set the drafting device to a specific radius or diameter by first adjusting the instrument with the aid of a separate measuring device such as a ruler, then accomplishing a finer adjustment by drafting and measuring trial circles until the proper size is obtained. All manual drafting devices in common use require the same time-consuming procedures in order to draft a circle, and require a great deal of patience and attention on the part of the draftsman in order to maintain the accuracy of the circle throughout the drafting procedure. Such devices employ an integral pencil or pencil lead and/or pen either as a part of the device or clamped to the device. Such pen and particularly pencil arrangements add to the difficulty of drafting an accurate circle in a reasonably short period of time.

There are various prior art patents which employ flat sheets of plastic, etc., and holes adapted to receive the end of a pencil, for example. All such devices known to applicants have major disadvantages, for example in that it is extremely time-consuming for the user to locate which hole is to be employed. Typically, such devices are full of indicia or numbers to specify which hole is which, creating great amounts of confusion, difficulty in manufacture, difficulty in using, etc. Other defects of the prior art devices include the fact that they are conventionally relatively difficult to rotate on the paper, and/or are highly expensive.

SUMMARY OF THE INVENTION

The present invention provides a device for determining the size of an existing circle, and for drafting a very precise circle, without the need for setting the radius with a measuring device or making trial circles. Furthermore, it allows the draftsman to use an ordinary drafting pencil or pen which is not a part of the device. Such device consists of a template containing a geometric pattern of holes specially designed to accept either a drafting pencil or drafting pen.

In order to use the device, the draftsman merely aligns the perpendicular crosshairs of the device with the perpendicular lines delineating the center of the circle to be drawn. The device is lowered onto the drafting surface in such a manner that the center pin, consisting of a shouldered needlepoint, is pushed into the center of the circle to be drawn. By merely locating the fraction of the desired circle on the outer perimeter, the correct hole is located by use of the radial inch or centimeter markings. All holes with a like fractional unit of measure are located on the same radial line with all other holes of that same fraction. When the device is in place and the correct hole is located, the drafting pen or pencil is inserted into the hole and the circle is drawn by rotating the pen or pencil around the circumference of the circle to be drawn. Due to the unique design of the device it is not necessary to hold it while drafting the circle.

By reversing the drafting process, any circle can be measured by simply reading the position of the hole that aligns itself with the circumference of the circle.

DESCRIPTION OF PREFERRED EMBODIMENTS

Figure 1:
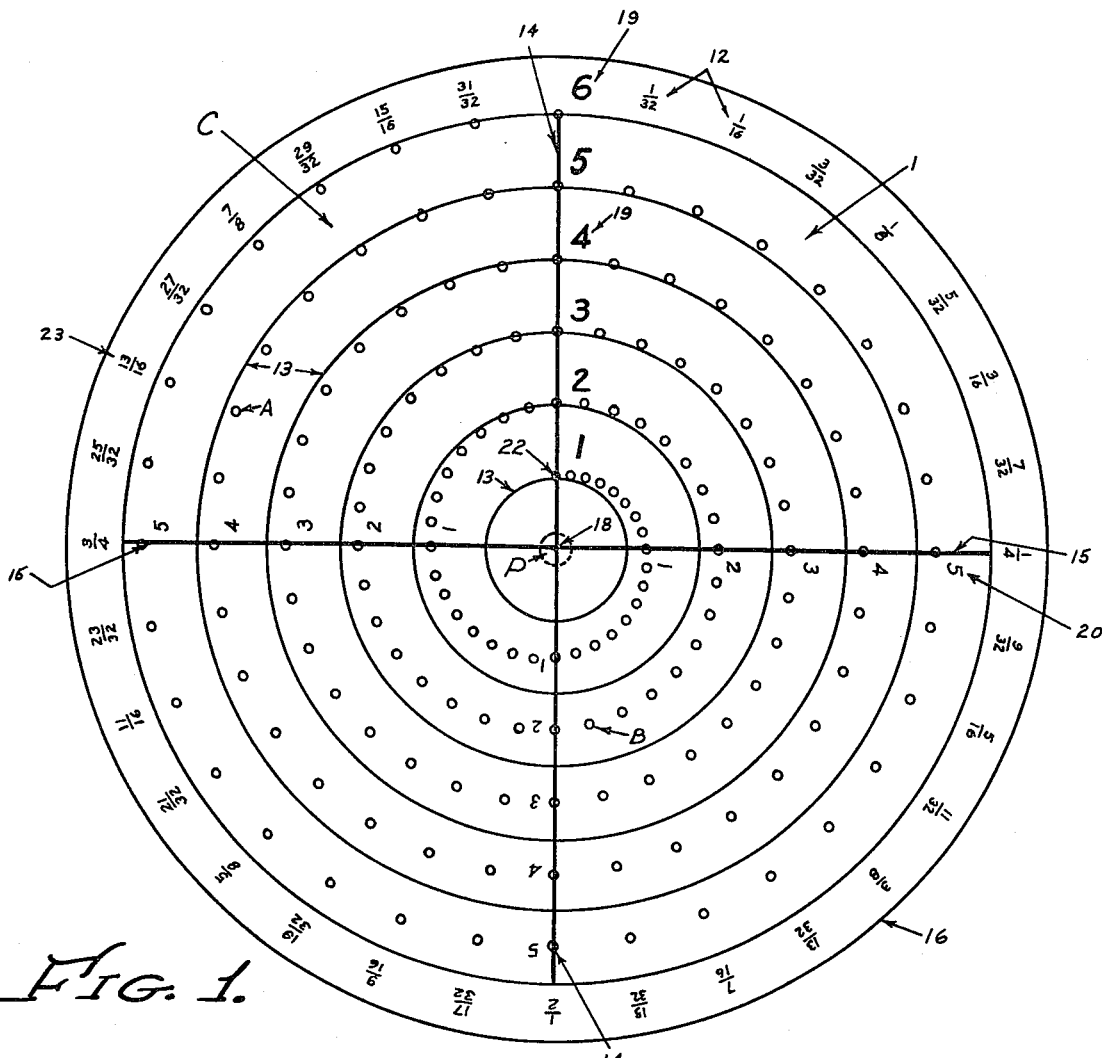
FIG. 1 is a plan view showing details of one of several possible geometric arrangements of holes, the center pin location and the means for locating the various holes.

The measuring compass device of the present invention is designated generally C in FIG. 1 of the drawings. As shown, it consists of a template of specially designed holes, a center pin, markings consisting of perpendicular lines, radius lines, whole numbers and fractions. As will be explained in detail, one variation of the device allows the draftsman to draw or measure any number of 161 extremely accurate circles from 1 inch to 6 inches in diameter or any fraction thereof in increments of 1/32 inch diameter, e.g. 1 1/32 inches to 5 31/32 inches. Indicia are indicated at 12.

Further, the device does not need to be held in place while in use and the draftsman is free to use a drafting pencil or pen of his choosing since the device does not embody either of the foregoing.

Considering now the apparatus of the present invention in more detail, the body C is a flat circular disc 1 formed of clear plastic such as polystyrene. At the very center of the device is a specially designed center pin P fashioned of hardened steel with a shoulder 21 that allows the device to rotate freely when inserted into the drafting paper mounted on a suitable drafting surface. At precisely ½ inch from the center pin P one of the specially designed holes is located as shown at 22. Thereafter, each subsequent hole is located precisely 11 ¼° in a clockwise direction starting from hole 22 and precisely 1/64 of an inch farther away from the center pin P (it is 1/64 on radius, representing 1/32 diameter). Consequently, a spiral, geometric pattern of holes is formed which causes each 360° loop of holes to provide thirty-two separate guide holes for drafting circles and causes each hole with a like fractional unit of measurement to fall in line radially with all other holes of that same fraction, i.e. 1 13/16, 2 13/16, 3 13/16, etc. This geometric progression of hole locations also causes each 360° loop of the spiral pattern to produce a circle of precisely one half inch radius farther from the center pin location. Furthermore, the net effect of this geometric progression of holes is to eliminate the necessity of labeling each individual hole which is a novel and unique feature of the invention.

The center pin P is constructed in such a fashion that the needlepoint 2 pierces the drafting paper and drafting surface with the weight of the device resting on the shoulder 21 thereby holding the device in position for hands-off drafting of any circle on the template. During the drafting procedure the pencil or pen is used to rotate the device with only a slight side pressure on the center pin P.

Figure 2:
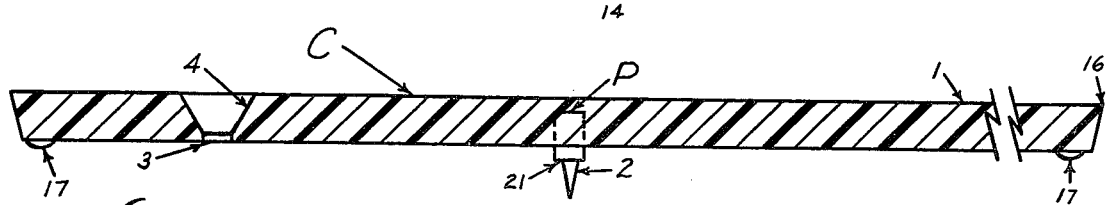
FIG. 2 is an elevational view, partly in section, depicting the hole design, beveled edge, center pin design and placement, and the design of the raised anti-friction pads.
Figure 3:
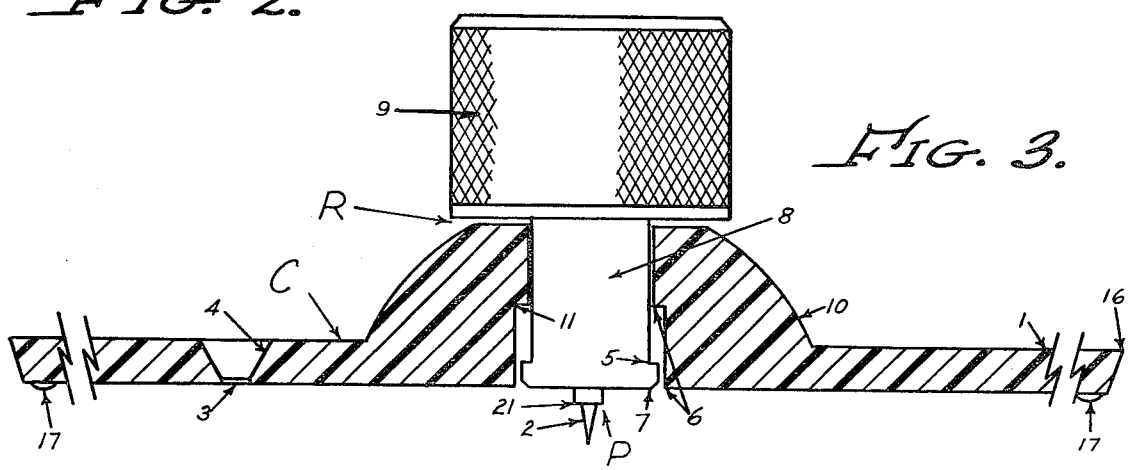
FIG. 3 is an elevational view, partly in section, of an alternate design with a retractable center pin arrangement.

Each of the one hundred sixty one holes depicted in FIG. 1 is constructed as shown in FIGS. 2 and 3. The lower portion of the hole 3 acts as a guide for the pen or pencil and is constructed slightly larger than the type of drafting instrument it is to accommodate. The height of the hole prior to the tapered portion is designed in such a fashion that a drafting pencil will not break its point in the event it is inserted vertically into the hole and then moved a reasonable distance toward the horizontal position. Both the height of this portion of the hole and the hole size (at opening 3) are design features of the apparatus since they determine both the accuracy and suitability of the device for use by the draftsman. The tapered portion 4 of each hole is designed to guide the draftsman's pen or pencil into the very narrow opening 3 of the hole and to further assure that the pencil point will not break.

The beveled edge 16 of the device, as depicted in FIGS. 2 and 3, is a design feature which enables the draftsman to more easily lift the apparatus from the drafting paper.

Anti-friction pads 17 have been provided as shown in FIGS. 2 and 3 in order to minimize the friction of the device against the drafting paper so it can rotate freely with the pressure of a sharp pencil or pen and to provide the necessary clearance to keep ink from smearing when drafting with a pen.

In order to facilitate the location of the center of a circle to be drafted, the device contains a vertical center line 14 and a horizontal center line 15 which form an intersection 18 at the center of center pin P. These cross-hairs or center lines may be superimposed over the draftsman's guidelines on his drawing in order to properly locate the device in the correct position. In FIG. 2 the center pin may be viewed through the clear plastic as an additional aid to the draftsman or, in the alternate design depicted in FIG. 3, through a reinforced optical viewing center 10 provided for easy viewing of the center pin P during pin insertion.

The construction and indicia are such that the draftsman can locate the correct hole in the shortest possible time. After the device is properly located at the center of the circle to be drawn, the procedure for drafting a circle with a diameter of 4 13/16 of an inch (see hole A) is to rotate the device C in order to place the fraction indicator 23 (13/16) at the 12 o'clock position. Then the draftsman simply locates the only hole (namely, A) which is in radial alignment with the fraction 23 and the center pin P, and also between the "4" and "5" one-inch (diameter) markings 13. These diameter markings are properly delineated by the primary guide numbers 19 at the 12 o'clock position or the supplementary guide numbers 20 at the 3, 6 and 9 o'clock positions. With these easily-used graphics, any of the 161 holes may be properly identified within a few seconds, e.g. the 2 15/32 inch hole (shown at B) in FIG. 1.

Considering the alternate embodiment of the device as depicted in FIG. 3 of the drawings, the body C contains a retractable center pin mechanism R. A reinforced optical viewing shoulder 10 forms the housing for a retractable metal or plastic centerpiece 8 with a knurled portion 9 for ease of handling and a shouldered 21 needlepoint center pin P as previously described. The tubular shaped centerpiece 8 is designed to slide within the reinforced shoulder in such a way that the top portion of the guide hole 6 is a slip fit in order that the retracting centerpiece will remain in either a retracted or extended position. A stop 5 is provided to control the retracting centerpiece so that the stop 5 will not pass beyond the stop shoulder 11 without exerting an abnormal amount of upward pressure. A chamfer 7 is provided at the lower end of the retractable centerpiece to facilitate assembly.

It will be appreciated that the device, as described herein, depicts only one version of the invention which is designed to operate under the U.S. Standard System of Weights and Measures in inches and by fractions of 1/32nd. of an inch thereof. Additional versions of the device embody the same basic principles of design, and each provides geometric patterns of holes which cause each like fractional unit of measurement to fall in line with all other holes of that same fraction. These alternate embodiments of design may encompass a version in metric by centimeters and tenths of centimeters, and a version in U.S. Standard by inches and decimals in thousandths of an inch.

The holes lie along an Archimedes spiral, which is defined in Merriam-Webster's *Third New International Dictionary* (unabridged) as "a plane curve generated by a point moving away from . . . a fixed point at a constant rate while the radius vector from the fixed point rotates at a constant rate." The center point of the Archimedes spiral is the center of the compass (at P).

Figure 4:
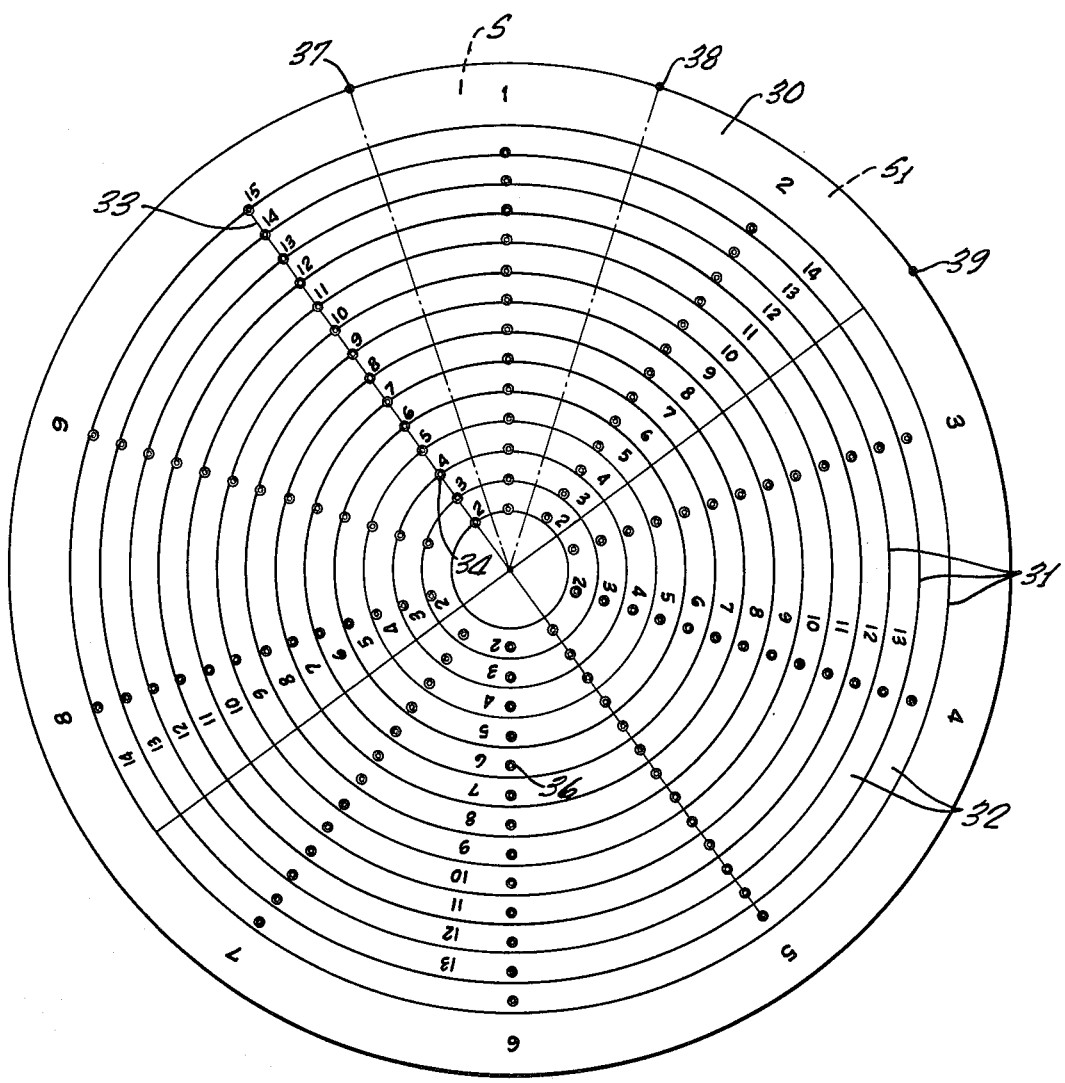
FIG. 4 is a plan view of another one of the devices constructed in accordance with the present invention, this one employing the metric system whereas the one shown in FIG. 1 is in inches and fractions of inches.

Embodiment of FIG. 4

Referring next to FIG. 4, there is shown a digital drafting and measuring compass employing the metric system as referred to above. The present compass permits the draftsman to make circles the diameters of which are measured in centimeters and tenths of centimeters (namely, millimeters).

A template 30 in the form of a disc of transparent plastic corresponds to what is shown in FIG. 1 except for hole location and indicia. It has a sectional shape corresponding to what is shown in FIG. 2.

There are numerous concentric circles 31 radially spaced one-half centimeter from each other, there being an annular zone 32 defined between each two radially-adjacent circles. In the present illustration, the innermost circle has a diameter of two centimeters. The circle having the next-larger diameter has a diameter of three centimeters, the next four, the next five, etc. Each circle has a diameter which is a whole number on the particular distance scale being employed, namely metric in the present instance. Furthermore, each circle has a radius (on the particular distance scale employed) which is selected from a group consisting of whole numbers, and half-whole numbers. Thus, the radius (as distinguished from the diameter) of the innermost circle is 1 centimeter, that of the next-larger circle 1.5 centimeters, that of the next-larger circle 2 centimeters, etc. (The words "half-whole" denote, in the present specification and claims, something which is either a whole number or is half-way between two successive whole numbers.)

Along one radial line, numbered 33, extending outwardly from the center are a series of holes adapted to receive the end of a drafting pen or pencil, or of a scriber, etc., each such hole being precisely on one of the concentric circles. Closely adjacent each such hole is a number indicating the diameter of the circle.

Thus, when the draftsman wishes to draw a circle having a diameter of four centimeters, he places his drafting instrument in the hole 34 and then draws a circle as described relative to the previous embodiment.

There are nine other radially-extending series of holes. The radial lines along which holes lie are angularly spaced from the next-adjacent series by equal angular distances, namely 36 degrees in the present illustration. At the peripheral portion of the device, the number "1" appears radially-outwardly from the hole series next-adjacent the series along line 33. Correspondingly, the next-adjacent series has the number "2", the next-adjacent the number "3", etc., through "9".

The holes along the series next-adjacent the first-indicated one lie one millimeter radially-outwardly from their respective circles. This one millimeter corresponds with number "1" at the periphery of the device. Correspondingly, the holes in the next series lie exactly 2 millimeters outwardly from their respective circles, as indicated by the number "2".

For example, if the draftsman wishes to draw a circle having a diameter of 6.6 centimeters, he first places the number "6" in the 12 o'clock position and then moves inwardly along the radial line until he is in the "6" zone (that is to say, the zone 32 between the 6 circle and the 7 circle). This point is indicated at 36. The hole is quickly found and the circle drawn thereafter. (If it is desired to measure a circle, the device is placed on the paper and it is noted which hole the circle falls beneath. This hole is rapidly located by reference to the zone and the indicia at the periphery of the device. The circle diameter is thus quickly and accurately measured.)

The various holes lie along an Archimedes spiral centered at the center of the device.

It has been found that the various circles, etc., are preferably molded onto the surface of the plastic instead of being black, in order to prevent any confusion between what is drawn on the paper and what is on the present drafting and measuring device.

Additional Description

In the first embodiment of the invention, FIGS. 1 through 3, the whole-number (or "half-whole") distance is in inches, whereas in the embodiment of FIG. 4 the whole-number (or "half-whole") distance is in centimeters. Each predetermined increment, in FIG. 1, of the whole number is a 32nd of an inch. Thus, in FIG. 1 the first radial line (immediately to the right of the vertical upper line in FIG. 1) is 1/32, the next-adjacent radial line is 1/16 (which is 2/32), the next is 3/32, the next is 4/32 (1/8), and so forth. In the embodiment of FIG. 4 each predetermined increment is a tenth of a centimeter or, namely, a millimeter. Various others are possible, as indicated above, for example, in 25-thousandths of inches, and in various other multiples to indicate different scales used by architects, for example.

In the great majority of cases, it is highly preferable to provide the present drafting and measuring instruments in forms related to the diameters (instead of the radii) of circles. For example, and referring to FIG. 1, the numbers 1, 2, 3, etc., which appear above the center of the circle (along the vertical radius) represent diameters. When this is done, and the device is divided into (for example) 1/32 inch increments, each of said 1/32 inch increments actually represents 1/64 inch on radius.

In addition, it is common in engineering practice to designate circles in terms of diameters. Thus, drafting is further simplified by the present tool since (as distinguished from a conventional compass) it is not necessary to divide the diameter by two in order to set the instrument.

Even though the present device is preferably marked in terms of diameters, the draftsman always knows the distance from the center since he merely has to divide each number by two. Thus, for example, relative to the number "4" which appears in the upper-middle portion of FIG. 1, the draftsman instantly knows that this is 2 inches from the center. Relative to the hole immediately to the right of the 2-inch (radius) hole, the draftsman instantly knows that this is 2 1/64 inches from center.

In some cases, it is preferable to mark the instrument in terms of radii instead of diameters. For example, applicants have invented (as one form of the present invention) a device particularly adapted for use by architects, and relative to which ¼ inch in radius represents one foot radius. This is a "¼ inch scale model." In such model, there are twelve concentric circles each having a radius ¼ inch larger than that of the next-inner circle. These circles are marked, respectively, and from the inside out, 1 foot, 2 feet, 3 feet, 4 feet, etc. About the periphery of the device are 12 numbers (marked "1" through "12") each representing one inch. The radial lines extend inwardly from such markings at the peripheral portion of the unit, and each has the same fractional or incremental relationship to a particular hole number as does the other holes along such radial line. For example, each hole along the radial line marked "3 inches" is three inches greater than one foot on the particular distance scale being used for the described compass.

Because the unit may be marked in terms of radius or diameter, the word "size" is sometimes used in the appended claims as a generic term designating both radius and diameter. When reference is made to the "size" of a circle it means that the size is either that particular radius or that particular diameter (not any circumference or area).

As above explained, one of the great advantages of the present device is that all of the holes representing a first predetermined fraction (for example, 1/32 inch or 1/10 centimeter) of a whole number on the particular distance scale are so located relative to each other that the user will immediately and easily recognize that all of the holes represent the same predetermined fraction. Referring, for example, to FIG. 1, all of the holes in the same fraction are located along a radial line from the center, and this is by far the preferred form of "so locating". With such an arrangement, the user can instantly see that anything radially-inwardly from a peripheral marking (for example, 1/32 inch, 1/16 inch, 3/32 inch, etc.) is in the same plurality of holes representing the predetermined fraction.

Stated generally, all of the holes representing each particular fraction are located in the same sector of a circle centered at the point of element "P". As an illustration, all of the holes representing a whole number plus 1 millimeter in FIG. 4 are disposed in a sector "S" which extends outwardly from the center of the circle on both sides of the radius containing all of such "plus 1 mm." holes. Such sector "S" is bounded, for example, by radii shown in phantom and extending out to points 37 and 38. Thus such sector may be regarded as defined by imaginary radial lines each lying (for example) one-half of the way between the upwardly-extending vertical radius (FIG. 4) and the "plus 0 mm." and "plus 2 mm.".

It would be possible, but much less desirable, to cause the "plus 1 mm." (for example) holes to be disposed in different portions of the sector S, instead of along the highly preferred radial line, and still come within the scope of certain claims of the present application. It is to be understood that, with such less-preferred form, the radial lines shown in phantom (to points 37 and 38) would actually be molded into the device. These additional radial lines would represent to the user what sector is being employed and would show him that any hole in such sector represents (for example) "plus 0 mm." The same applies to all of the other indicia at the peripheral portions of FIG. 1 and FIG. 4.

An additional sector, "$S_1$", is bounded by radii extending to points 38 and 39. Other sectors, not shown as bounded by marked radii, are present clear around the device.

For rapid finding of the holes, which is one of the great advantages of the present invention, it is important that the angularly adjacent fractions vary progressively. Referring to FIG. 1, it is emphasized that the "1/16" radius is adjacent the "1/32" radius, that the "3/32" is next, and so forth entirely around the circle until "31/32" is arrived at. Because of this progression, the user spins the device (as stated) in order to arrive very rapidly at the predetermined fraction (which could be a fraction of an inch, a fraction of a foot, a fraction of a foot in scale, a fraction of a centimeter, etc.). In the form illustrated in FIG. 1, "1/32" is the smallest fraction of the whole number, "1/16" is the next-largest size, "3/32" is the next largest, etc., throughout the device.

To designate the various whole numbers, namely annular-zones 32 (FIG. 4), the illustrated circles are greatly preferred. Less preferably, the circles may be interrupted instead of continuous. Furthermore, the "zones" may be designated by colors or by breaks in the numerous radial lines which may be provided (for example), to separate the sectors indicated above).

The word "paper" is used in the claims but not as a limitation, it being understood that the substance marked-on could be cardboard, metal, plastic, etc.

The various fractions in the present devices are multiples of the particular increment employed. Thus, where (as in FIG. 1) the increment is 1/32, the other fractions are 2/32, 3/32, 4/32, etc. As another example, where (as in FIG. 4) the increment is 1/10 (0.1), the other fractions are 2/10, 3/10, 4/10, etc.

The foregoing detailed description is to be clearly understood as given by way of illustration and example only, the spirit and scope of this invention being limited solely by the appended claims.

What is claimed is:

1. A drafting and measuring compass for the drafting and measuring of circles, which comprises:
   (a) a template adapted to be disposed on a sheet of paper in parallel relationship to said paper and adjacent thereto,
   (b) centering means associated with said template to enable the same to be rotated about a predetermined center which is fixed relative to said paper,
   (c) zone means provided on said template to indicate concentric and generally annular zones centered at said predetermined center,
      each of said zones having its boundary relatively adjacent said predetermined center located a first predetermined distance from said predetermined center, and having its boundary relatively remote from said predetermined center located at a second and higher predetermined distance from said predetermined center,
      said boundaries and predetermined distances being such that the user may quickly and easily know that a particular point on said template is located more than a certain distance from said predetermined center and less than the next higher distance therefrom, and may also know the magnitudes of said distances on the particular distance sacle being employed on said compass,
   (d) a multiplicity of holes provided in said template and each adapted to receive a drafting instrument which will make a line on said paper in response to rotation of said template about said predetermined center so that a circle is drawn on said paper,
      said holes lying generally along radial lines from said predetermined center and also lying in various ones of said annular zones,
         all the holes located a first predetermined fraction of each whole number of said particular distance scale being employed on said compass being disposed generally along one such radial line,
         all the holes located a second predetermined fraction of each whole number of said particulr distance scale being employed on said compass being disposed generally along another such radial line,
         all of the holes located various additional predetermined fractions of each said whole number being respectively located generally along various additional radial lines, and
   (e) indicating means on said template to indicate which one of said fractions each of said radial lines represents,
      whereby the relationship of any one of said holes to said predetermined center may be rapidly known by using (1) said indicating means and the radial line for the particular fraction and (2) said zone means indicating zones.

2. The invention as claimed in claim 1, in which said zone means comprises a plurality of concentric circles provided on said template, the radial distance of each circle from said predetermined center being selected from a group consisting of whole numbers and half-whole numbers of said particular distance scale being employed on said compass.

3. The invention as claimed in claim 2, in which a number is provided on said template between each two of said circles, said number being correlated to the distances of said circles from said predetermined center and indicating that any one of said holes disposed between each two radially-adjacent circles is more than a certain distance from said predetermined center and less than the next-higher distance therefrom.

4. The invention as claimed in claim 1, in which said indicating means is provided about the periphery of said template, there being one part of said indicating means to indicate the particular fraction that each of said radial lines represents.

5. The invention as claimed in claim 1, in which said template is a flat sheet of transparent plastic.

6. The invention as claimed in claim 1, in which said centering means comprises a pointed element disposed on said template at said predetermined center and adapted to be inserted into said sheet of paper.

7. The invention as claimed in claim 6, in which spacer and antifriction means are provided on said template to maintain the same spaced a slight distance from said paper, whereby to achieve the simultaneous advantages of minimization of friction during rotation and prevention of smearing of ink when said drafting instrument is a drafting pen.

8. The invention as claimed in claim 7, in which said means comprises a plurality of protuberances extending downwardly from said template in spaced relationship from said pointed element.

9. The invention as claimed in claim 8, in which shoulder means are provided on said template adjacent said pointed element to prevent the point from penetrating more than a small distance into said paper and to aid in said maintaining of said template spaced from said paper for prevention of smearing of ink.

10. The invention as claimed in claim 1, in which said holes lie along an Archimedes spiral, whereby said indicating means indicates progressively different fractions from one adjacent radial line to the next adjacent radial line.

11. The invention as claimed in claim 1, in which said template contains a geometric pattern of holes, with each hole placed in such manner along said radial lines that all holes of like fractional units of measurement fall in radial alignment with all other holes of the same fractional unit of measurement, for example 1 13/16 inch, 2 13/16 inch, and so forth.

12. The invention as claimed in claim 1, in which said template contains a spiral, geometric pattern of holes with each hole placed in such manner that all holes of a like fractional unit of measurement fall in line radially with all other holes of the same fractional unit of measurement, for example 1.2 centimeters, 2.2 centimeters, and so forth.

13. The invention as claimed in claim 1, in which said template is transparent and contains two perpendicular guidelines that intersect at said predetermined center of the device, for properly locating of the device for either drawing or measuring a circle.

14. A drafting and measuring compass for the drafting and measuring of circles, which comprises:
 (a) a template adapted to be disposed on a sheet of paper in parallel relationship to said paper and adjacent thereto,
 (b) means associated with said template to enable the same to be rotated about a predetermined center which is fixed relative to said sheet of paper,
 (c) a multiplicity of holes provided in said template and each adapted to receive a drafting instrument which will make a line on said paper in response to rotation of said template about said predetermined center so that a circle is drawn on said paper,
  said holes lying along an Archimedes spiral centered at said predetermined center,
  all holes located a first predetermined fraction of each whole number of the particular distance scale employed on said template being disposed along one radial line extending from said center,
  all the holes located a second and next-higher predetermined fraction of each whole number of the particular distance scale employed on said template being disposed along a radial line extending from said center and adjacent said one radial line, all of the holes located numerous additional fractions lying generally along additional radial lines from said center, and
 (d) indicating means on said template to indicate the particular one of said fractions which each of said radial lines represents.

15. The invention as claimed in claim 14, in which zone-indicating means are provided on said template to indicate generally annular zones centered at said predetermined center, each such zone representing a certain whole number radius or diameter on said particular distance scale, whereby the position of any one of said holes in said Archimedes spiral may be located and known by using (1) said first-mentioned indicating means, and (2) the zone-indicating means.

16. The invention as claimed in claim 14, in which said Archimedes spiral is such that all of the holes representing selected fractions of each whole-number distance for the particular distance scale used on said template are present in only a single revolution about said center.

17. A drafting compass for drafting of circles, in either pencil or ink, which comprises:
 (a) a template adapted to be disposed on a sheet of paper in parallel relationship to said paper and adjacent thereto,
 (b) point means provided on said template and adapted to be inserted into said paper to provide a center point,
 (c) low-friction protuberances provided on the lower side of said template and adapted to slide along said paper in low-friction manner to thereby achieve the conjoint benefits of reducing friction during rotation, and maintaining said template spaced from said paper whereby to prevent smearing of ink,
 (d) a multiplicity of holes provided in said template and each adapted to receive a drafting instrument which will make a line on said paper in response to rotation of said template about said point means, so that a circle is drawn on said paper, said holes being so located that those representing different fractions of whole numbers are in different sectors of a circle centered at said point means, and
 (e) indicia indicating which fraction each sector represents.

18. The invention as claimed in claim 17, in which said template is formed of transparent plastic and said protuberances are integral therewith.

19. The invention as claimed in claim 18, in which integral shoulder means are provided at said point means to prevent penetration of the point more than a predetermined distance into said paper, and to aid in maintaining said template spaced above said paper for prevention of smearing of ink.

20. A drafting and measuring compass device with which the user can, without using a ruler, (a) first rapidly select the precise circle he desires to draw or measure and (b) then quickly and easily draw or measure said circle, said compass comprising:
 (a) a template adapted to be disposed on a sheet of paper in parallel relationship to said paper and adjacent thereto,
 (b) centering means associated with said template to enable the same to be rotated about a predetermined center which is fixed relative to said paper,
 (c) a multiplicity of holes provided in said template and each adapted to receive a drafting instrument which will make a line on said paper in response to rotation of said template about said predetermined center so that a circle is drawn on said paper, a first plurality of said holes each representing a first predetermined fraction of a whole number on the particular distance scale being used on said compass, said holes in said first plurality being so spaced, at different distances from said predetermined center, that one such hole will draw a circle the size of which is a whole number plus said first fraction on said particular distance scale; that a second such hole will draw a circle the size of which is a different whole number plus said first fraction on said scale; and so forth, a second plurality of said holes each representing a second predetermined fraction of a whole number on said scale, said holes in said second plurality being so spaced, at different distances from said predetermined center, that one such hole will draw a circle the size of which is a whole number plus said second fraction on said particular distance scale; that a second such hole will draw a circle the size of which is a different whole number plus said second fraction on said scale; and so forth, third, fourth, fifth, sixth and additional pluralities of said holes being similarly spaced and related as set forth above in this clause and representing, respectively, third, fourth, fifth, sixth and additional predetermined fractions of a whole number on said scale, all of said holes in said first plurality being so located in predetermined relationship to each other that the eye of the user will immediately and easily recognize that all such holes represent the same predetermined fraction of a whole number on said scale; all of said holes in said second plurality being so located in predetermined relationship to each other that the eye of the user will immediately and easily recognize that all such holes represent the same predetermined fraction of a whole number of said scale, all of said holes in said third, fourth, fifth, sixth and additional pluralities being so located in predetermined relationship to each other that the eye of the user will immediately and easily recognize that all such holes in each such plurality represent the same predetermined fraction of a whole number on said scale, and (d) indicia provided on said template to indicate quickly and easily to the user the particular fractions which, respectively, said first, second, third, fourth, fifth, sixth and additional pluralities represent.

21. The invention as claimed in claim 20, in which said predetermined relationships are such that the holes in each of said first, second, third, fourth, fifth, sixth and additional pluralities are located in the same sector of a circle centered at said predetermined center, and in which the holes in different ones of said pluralities are located in different sectors of said circle.

22. The invention as claimed in claim 21, in which the holes in each of said first, second, third, fourth, fifth, sixth and additional pluralities are disposed generally along a radius line passing through said predetermined center.

23. The invention as claimed in claim 22, in which said holes in each of said pluralities are located precisely along radius lines.

24. The invention as claimed in claim 21, in which said first predetermined fraction is the smallest fraction, of said whole number, which is employed on said compass, all of the holes representing said smallest fraction being disposed in a first sector of said circle; in which said second predetermined fraction is the next-larger fractional size, of said whole number, which is employed on said compass, all of the holes representing said next-larger increment being disposed in a second sector of said circle, said second sector being adjacent said first sector; in which said third predetermined increment is the next-larger fractional size, of said whole number, which is employed on said compass, all of the holes representing said next-larger fractional size being disposed in a third sector of said circle and which is adjacent said second sector thereof; and so forth relative to progressively larger fractions of said whole number, whereby the user may readily and quickly, by spinning said template about said center, determine the location of the particular increment which he desires to employ.

25. The invention as claimed in claim 20, in which said indicia comprises a number of numbers disposed, respectively, in said sectors, there being one such number in each sector and designating the particular fraction corresponding to the locations of the holes in said sector.

26. The invention as claimed in claim 25, in which said numbers are provided on said template at the peripheral region thereof.

27. The invention as claimed in claim 20, in which the holes in each of said pluralities lie along a radius of a circle centered at said predetermined center, and in which all of said holes lie along an Archimedes spiral centered at said predetermined center.

28. The invention as claimed in claim 27, in which said spiral is such that there is one full rotation of said spiral for each whole-number change in the size of said circle.

29. The invention as claimed in claim 20, in which means are provided on said template to indicate rapidly and easily to the user which whole number, in the size of the circle, the fraction is based on.

30. The invention as claimed in claim 29, in which said means to indicate whole numbers comprises a plurality of concentric circles provided on said template.

31. The invention as claimed in claim 20, in which said centering means comprises a point at said predetermined center and adapted to penetrate into the paper, and in which low-friction pads are provided on the underside of said template to bear against said paper for the purposes of both minimizing friction and preventing smearing of ink.

32. The invention as claimed in claim 30, in which different numbers are provided on said template adjacent said concentric circles to indicate different whole numbers.

33. The invention as claimed in claim 1, in which each of said second, third and subsequent fractions is a multiple of said first predetermined fraction, for example 2/32, 3/32, 4/32, etc.

34. The invention as claimed in claim 14, in which each of said second, third and subsequent fractions is a multiple of said first predetermined fraction, for example 2/10, 3/10, 4/10, etc.

35. The invention claimed in claim 20, in which each of said second, third and subsequent fractions is a multiple of said first predetermined fraction, for example 2/10, 3/10, 4/10, etc.

* * * * *